(12) United States Patent
Schuetz et al.

(10) Patent No.: US 11,519,484 B2
(45) Date of Patent: Dec. 6, 2022

(54) SUPPORTED SPINDLE AND MANUFACTURING METHOD FOR A SUPPORTED SPINDLE

(71) Applicant: Robert Bosch GmbH, Stuttgart (DE)

(72) Inventors: Henning Schuetz, Abstatt (DE); Willi Nagel, Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/048,839

(22) PCT Filed: Jun. 6, 2019

(86) PCT No.: PCT/EP2019/064806
§ 371 (c)(1),
(2) Date: Oct. 19, 2020

(87) PCT Pub. No.: WO2020/011456
PCT Pub. Date: Jan. 16, 2020

(65) Prior Publication Data
US 2021/0164551 A1    Jun. 3, 2021

(30) Foreign Application Priority Data

Jul. 11, 2018   (DE) .......................... 102018211552.4

(51) Int. Cl.
*B60T 13/74*    (2006.01)
*F16H 25/20*    (2006.01)
(Continued)

(52) U.S. Cl.
CPC ............ *F16H 25/24* (2013.01); *B60T 13/745* (2013.01); *F16C 3/023* (2013.01); *B60Y 2410/124* (2013.01); *F16H 2025/2037* (2013.01)

(58) Field of Classification Search
CPC .. B60T 13/745; B60T 13/746; F16H 25/2015; F16H 25/24; F16H 2025/2037
See application file for complete search history.

(56) References Cited

U.S. PATENT DOCUMENTS

| 10,493,969 | B2 * | 12/2019 | Gaffe ..................... B60T 13/745 |
| 2018/0251115 | A1 * | 9/2018 | Nagel .................... B60T 17/221 |
| 2018/0362000 | A1 | 12/2018 | Jammes et al. | |

FOREIGN PATENT DOCUMENTS

| CN | 203005406 U | 6/2016 | |
| DE | 102015217522 A1 * | 3/2017 | .............. B60T 11/20 |

(Continued)

OTHER PUBLICATIONS

International Search Report dated Sep. 20, 2019 for PCT/EP2019/064806.

*Primary Examiner* — Bobby Rushing, Jr.
(74) *Attorney, Agent, or Firm* — Norton Rose Fulbright US LLP; Gerard Messina

(57) ABSTRACT

A supported spindle for a device equipped with a spindle nut. The supported spindle includes a spindle body extending along its center longitudinal axis, a support plate, which is welded onto the spindle body in such a way that a weld seam formed between the spindle body and the support plate extends around the center longitudinal axis of the spindle body, and a ring element framing a section of the center longitudinal axis of the spindle body, which contacts the support plate on at least one first contact surface of the ring element and contacts the spindle body on at least one second contact surface of the ring element in such a way that the ring element is clamped between the support plate and the spindle body.

13 Claims, 6 Drawing Sheets

(51) Int. Cl.
*F16H 25/24* (2006.01)
*F16C 3/02* (2006.01)

(56) References Cited

FOREIGN PATENT DOCUMENTS

| | | | |
|---|---|---|---|
| DE | 102015217522 A1 | 3/2017 | |
| ES | 2664369 A1 | 4/2018 | |
| WO | 2017045805 A1 | 3/2017 | |
| WO | WO-2017045804 A1 * | 3/2017 | .............. B60T 11/18 |
| WO | WO-2017045805 A1 * | 3/2017 | .............. B60T 11/18 |
| WO | WO-2017045956 A1 * | 3/2017 | .............. B60T 13/62 |

* cited by examiner

SUPPORTED SPINDLE AND MANUFACTURING METHOD FOR A SUPPORTED SPINDLE

FIELD

The present invention relates to a supported spindle for a device equipped with a spindle nut. The present invention also relates to a device including a supported spindle and a cooperating spindle nut. Furthermore, the present invention relates to a manufacturing method for a supported spindle for a device equipped with a spindle nut.

BACKGROUND INFORMATION

FIGS. 1a and 1b show schematic overall and partial representations of a conventional spindle as described, for example, in German Patent Application No. DE 10 2015 217 522 A1.

Conventional spindle 10 which is schematically shown FIGS. 1a and 1b is designed to cooperate with a spindle nut (not shown). In addition, a support plate 12 is welded onto conventional spindle 10, with the aid of which spindle 10 is held in a rotationally-fixed manner. This is to be understood to mean that in the event of a rotation of the spindle nut triggered with the aid of an electric motor (not shown), conventional spindle 10 is adjusted together with support plate 12 along an adjustment axis 14 extending centrally through spindle 10. A torque M of the electric motor, which is schematically shown in FIG. 1a, is thus converted into an action force $F_{action}$ aligned along adjustment axis 14.

The adjustment movement of conventional spindle 10 and support plate 12 along adjustment axis 14, which is effectuated with the aid of action force $F_{action}$, is guided with the aid of two guide bushings 16, which are inserted into support plate 12 and are each adjustably arranged on a (schematically shown) guide armature 18. With the aid of the adjustment movement of conventional spindle 10 and support plate 12 along adjustment axis 14, for example, at least one adjustable piston (not shown) of at least one braking system component of a hydraulic or pneumatic braking system may be adjusted against at least one pressure-effectuated counterforce $F_{resist}$.

FIG. 1b shows a weld seam 20 formed during the welding of support plate 12 on conventional spindle 10, which extends annularly around adjustment axis 14. Produced weld seam 20 extends in parallel to adjustment axis 14 with a penetration depth through support plate 12, which defines an attachment width Δ of support plate 12 on conventional spindle 10.

SUMMARY

The present invention provides a supported spindle for a device equipped with a spindle nut, a device, and a manufacturing method for a supported spindle for a device equipped with a spindle nut.

The present invention provides supported spindles having operational stability improved in relation to the related art. Although the support plate is generally manufactured as a stamped-bent part for reliably fulfilling the function while precisely maintaining its setpoint geometry, and therefore only having a relatively minor plate thickness, and although cost-effective manufacturing of the spindle body with the aid of a rolling process in mass production requires sufficient formability of its material, the operational stability of the supported spindle according to an example embodiment of the present invention is ensured by the ring element clamped between the support plate and the spindle body. Therefore, high-strength materials may be dispensed with without problems in the manufacturing of support plate and spindle body, and nonetheless the desired high level of operational stability may be effectuated with the aid of the clamped ring element. With the aid of the clamped ring element, a bending resistance torque of the particular supported spindle may additionally be significantly increased. The support plate may be designed without problems as a precision part having a relatively minor plate thickness, and nonetheless a high level of rigidity of the supported spindle may be ensured with the aid of the clamped ring element. The ring element increases the bending resistance torque and thus above all protects the weld seam from deformation and lateral forces. This lengthens a service life of the particular supported spindle.

A further advantage of the design according to an example embodiment of the present invention of supported spindles each having the clamped ring element is a protection improved in this way for a spindle body thread of the spindle body from welding beads during the laser welding of spindle body and support plate. Although a penetration depth of a laser beam used for laser welding may vary with a high spread, with the aid of the particular clamped ring element, a contamination of the spindle body thread of the spindle body with welding beads may be reliably prevented even if a melt escapes. This also contributes to improving an operational stability of the supported spindles according to the present invention.

In one advantageous specific embodiment of the supported spindle in accordance with the present invention, the ring element has at least one material receptacle depression on its side oriented toward the support plate and is pressed in a pre-tensioned manner between the support plate and the spindle body. This enables the ring element to be enclosed between the support plate and the spindle body having a pre-tension in the ring element, whereby a full fit of contact surfaces of the ring element to the support plate may be ensured. To additionally increase a robustness of a connection of the ring element to the support plate or to make the connection insensitive to geometry deviations, the ring element may be axially pre-tensioned. This may be effectuated, for example, by using a press connection or a press fit between support plate and spindle.

The ring element preferably includes at least one relief groove on its side oriented toward the support plate. Cracks within the ring element may be prevented with the aid of the at least one relief groove. The operational stability of this specific embodiment of the supported spindle may thus be additionally increased with the aid of the at least one relief groove.

In another advantageous specific embodiment of the supported spindle in accordance with the present invention, the first contact surface of the ring element, which contacts the support plate, is rounded or aligned at a first angle of inclination between 15° and 75° in relation to the center longitudinal axis of the spindle body. Alternatively or in additional thereto, the second contact surface of the ring element, which contacts the spindle body, may also be rounded or aligned at a second angle of inclination between 15° and 75° in relation to the center longitudinal axis of the spindle body. As is clear on the basis of the following descriptions, a load path for an axial load may be guided through the ring element with the aid of the first contact surface thus formed and/or the corresponding second contact surface in such a way that a service life of the specific embodiments of supported spindles described here is additionally increased.

The weld seam preferably extends at a mean distance to the center longitudinal axis of the spindle body around the center longitudinal axis of the spindle body, the spindle body including a protrusion on a section framed by the ring element, which is designed in such a way that at least one outer surface of the protrusion extending around the center longitudinal axis of the spindle body includes a minimum distance to the center longitudinal axis of the spindle body which is greater than the mean distance of the weld seam to the center longitudinal axis of the spindle body. As explained in greater detail hereinafter, undesired welding-on of the ring element may be reliably prevented with the aid of the formation of such a protrusion.

As an alternative to the above-described specific embodiment of the present invention, the weld seam may have an average width radially in relation to the center longitudinal axis of the spindle body, the ring element being clamped between the support plate and the spindle body in such a way that an air gap is provided between the section of the spindle body framed by the ring element and the ring element, which has a mean gap width radially in relation to the center longitudinal axis of the spindle body greater than or equal to one-fourth of the average width of the weld seam. Undesired welding-on of the ring element may also be reliably prevented with the aid of ensuring such an air gap between the section of the spindle body framed by the ring element and the ring element.

The above-described advantages are also ensured in a device including such a supported spindle and a spindle nut with a spindle nut thread in which a spindle body thread of the spindle body engages, the spindle body being held rotationally fixed with the aid of the support plate in such a way that the supported spindles are adjustable with the aid of a spindle nut set into rotation along an adjustment axis, on which the center longitudinal axis of the spindle body lies. The device may be, for example, a motorized wheel brake device which may be situated or is situated on a wheel of a vehicle or an electromechanical brake booster which may be situated or is situated upstream of a brake master cylinder of a hydraulic braking system. The present invention may thus be used in a variety of ways. However, it is to be expressly noted that the examples mentioned here for the device equipped with the supported spindle are not to be interpreted as exhaustive.

Furthermore, in accordance with an example embodiment of the present invention, carrying out a corresponding manufacturing method for a supported spindle for a device equipped with a spindle nut also provides the above-explained advantages. It is to be expressly noted that the manufacturing method may be refined according to the above-explained specific embodiments of supported spindles and/or devices equipped therewith.

BRIEF DESCRIPTION OF THE DRAWINGS

Further features and advantages of the present invention are explained hereinafter on the basis of the figures.

DETAILED DESCRIPTION OF EXAMPLE EMBODIMENTS

Figure 1A:
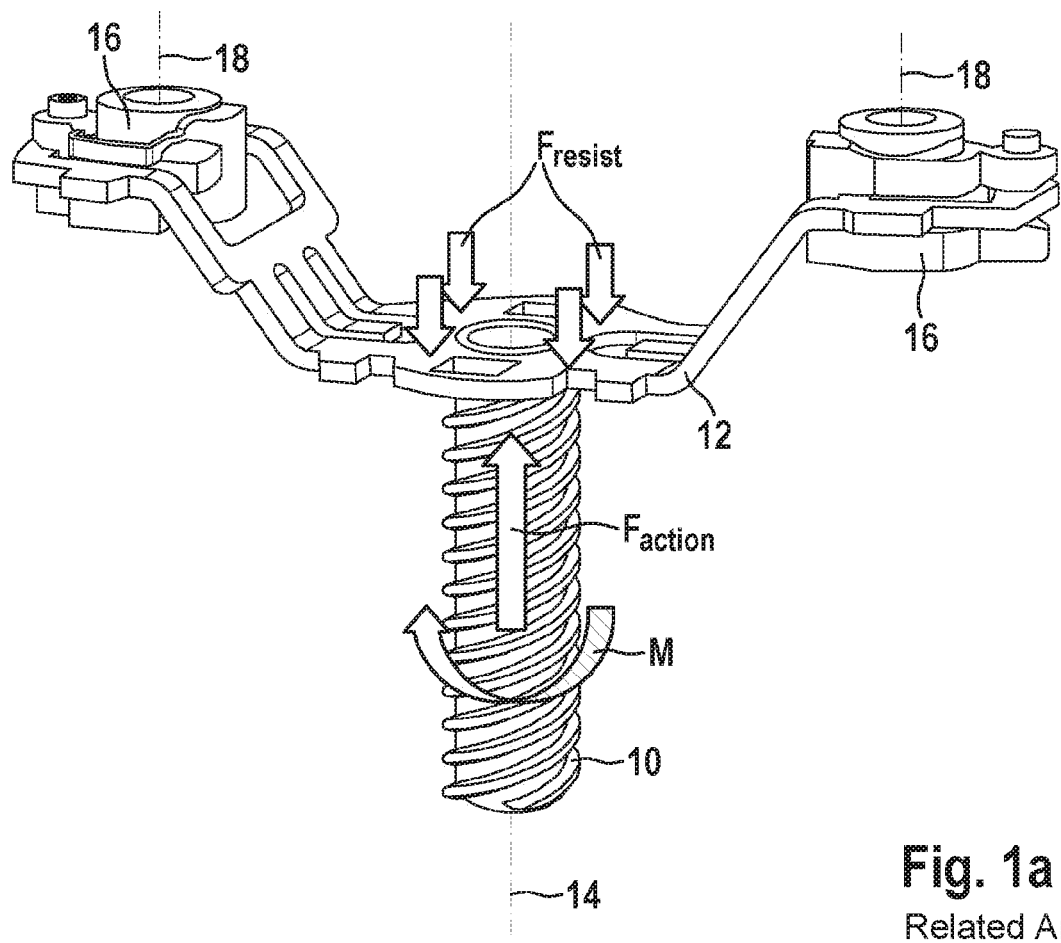
FIGS. 1a and 1b show schematic overall and partial representations of a conventional spindle.
Figure 1B:
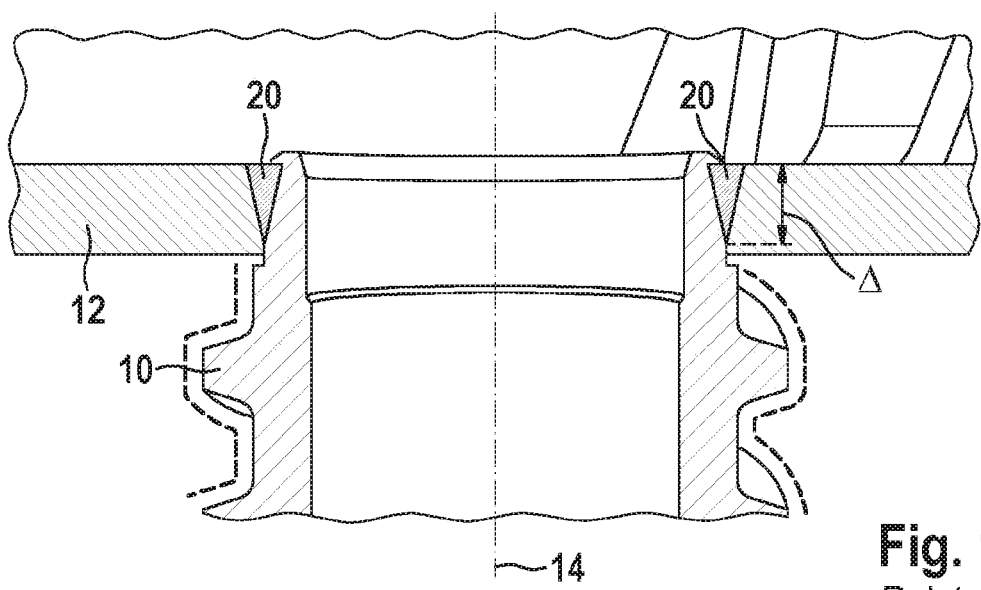
Figure 2A:
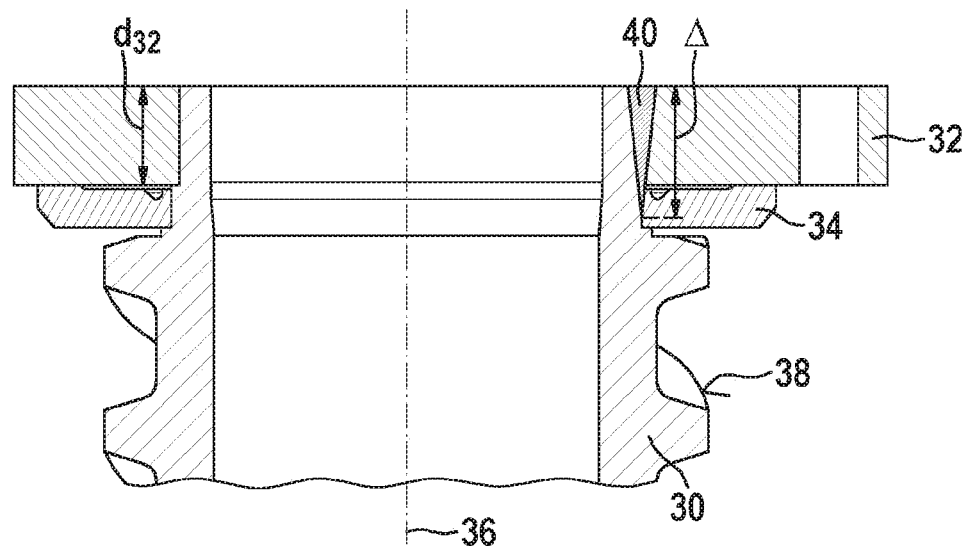
FIGS. 2a and 2b show schematic overall and partial representations of a first specific embodiment of the supported spindle in accordance with the present invention.
Figure 2B:
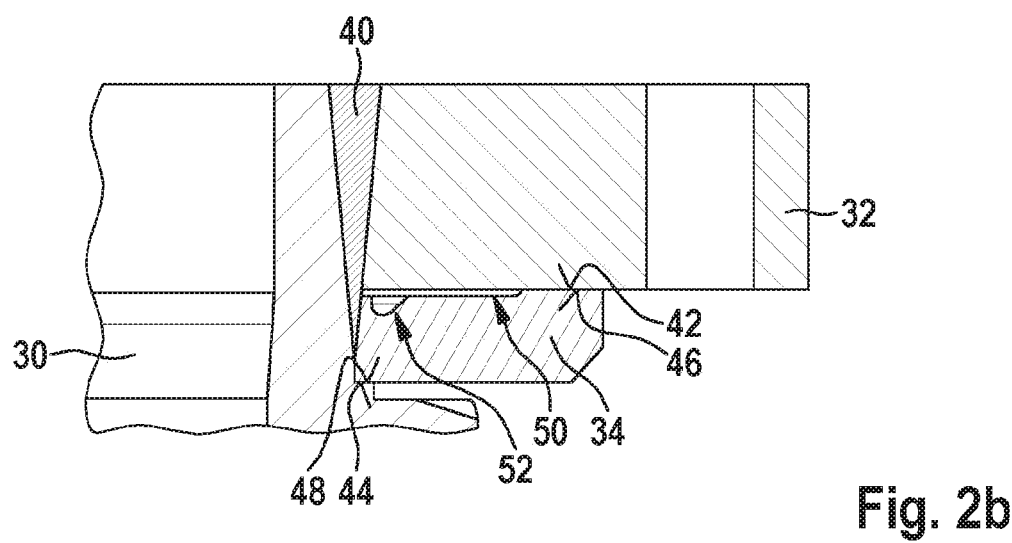

FIGS. 2a and 2b show schematic overall and partial representations of a first specific embodiment of the supported spindle in accordance with the present invention.

The supported spindle schematically shown in FIGS. 2a and 2b includes a spindle body 30, a support plate 32, and a ring element 34. The supported spindle formed from (at least) components 30 through 34 may thus also be referred to as a supported spindle component.

The supported spindle formed from (at least) components 30 through 34 is designed to cooperate with a spindle nut (not shown). The supported spindle is installable for this purpose in and/or at a device equipped with the spindle nut. Spindle body 30 extending along its center longitudinal axis 36 includes a spindle body thread 38 (as a male thread), which extends "spiraled" around center longitudinal axis 36 of spindle body 30 and with which a spindle nut thread of the spindle nut may engage.

Support plate 32 is to be understood as a component with the aid of which spindle body 30 is held in a rotationally-fixed manner in the device equipped with the spindle nut after the arrangement of the supported spindle. The supported spindle is therefore adjusted upon a rotation (effectuated with the aid of an operation of an electric motor) of the spindle nut along an adjustment axis, on which center longitudinal axis 36 of spindle body 30 lies. Support plate 32 may therefore also be referred to as an anti-rotation plate (ARP). In spite of the use of the term "plate" for support plate 32, support plate 32 does not have to be understood as a flat element. Support plate 32 may also have a curved shape, in particular an offset shape, for example. Alternately, at least one guide bushing, which is guided in each case along a guide armature associated with it, may also be fastenable/fastened on support plate 32.

Support plate 32 is welded on spindle body 30 in such a way that a weld seam 40 formed (at least) between spindle body 30 and support plate 32 extends around center longitudinal axis 36 of spindle body 30. The individual sectors of weld seam 40 extend in parallel to center longitudinal axis 36 of spindle body 30 including an average extension which is referred to hereinafter as a penetration depth of weld seam 40. The penetration depth of weld seam 40 defines an attachment width Δ of support plate 32 at spindle body 30.

Support plate 32 is preferably welded on with the aid of a laser beam or by a laser welding process.

Ring element 34 frames a section of center longitudinal axis 36 of spindle body 30. Ring element 34 thus extends annularly around center longitudinal axis 36 of spindle body 30. However, ring element 34 does not have to be understood as a component having a "solely annular shape." Ring element 34 contacts support plate 32 on at least a first contact surface 42 of ring element 34 and contacts spindle body 30 on at least a second contact surface 44 of ring element 34 in such a way that ring element 34 is clamped between support plate 32 and spindle body 30.

Ring element 34 clamped between support plate 32 and spindle body 30 causes a mechanical reinforcement of a highly loaded area close to weld seam 40. Therefore, a material having a formability sufficient for a rolling process for manufacturing spindle body 30 in mass production may be selected for spindle body 30, ring element 34 nonetheless ensuring a desired operational stability of the supported spindle. A use of a high-strength material may also be dispensed with without problems for support plate 32, since ring element 34 guarantees a sufficient mechanical reinforcement of the highly loaded area adjacent to weld seam 40. Therefore, a cost-effective stamped-bent part may be used as support plate 32. In addition, the mechanical reinforcement of the highly-loaded area adjacent to weld seam 40 effectuated with the aid of ring element 34 enables a reduction of a thickness $d_{32}$ of support plate 32 in parallel to center longitudinal axis 36 of spindle body 30. The reduction of thickness $d_{32}$ of support plate 32 facilitates maintaining a setpoint geometry of the support plate and thus enables reliable manufacturing of support plate 32 as a precision part.

As is schematically shown in FIG. 2b, thickness $d_{32}$ of support plate 32 in parallel to center longitudinal axis 36 of spindle body 30 may even be less than the penetration depth of weld seam 40 for welding support plate 32 at spindle body 30. With the aid of ring element 34, even in this case contamination of spindle body thread 38 with welding beads may be reliably prevented. Moreover, ring element 34 may also be welded onto spindle body 30 during the welding of support plate 32, so that weld seam 40 possibly extends into ring element 34. Attachment width Δ of support plate 32 on spindle body 30 may thus be greater than thickness $d_{32}$ of support plate 32, whereby a rigidity of the supported spindle is additionally increased.

In the example of FIGS. 2a and 2b, first contact surface 42 and second contact surface 44 of ring element 34 clamped between support plate 32 and spindle body 30 are aligned perpendicularly to center longitudinal axis 36 of spindle body 30. First contact surface 42 of ring element 44 thus contacts a first counter contact surface 46 of support plate 32, which is also aligned perpendicularly to center longitudinal axis 36 of spindle body 30. Correspondingly, second contact surface 44 of ring element 34 contacts a second counter contact surface 48 of spindle body 30 aligned perpendicularly to center longitudinal axis 36 of spindle body 30. If weld seam 40 extends in ring element 34, second contact surface 44 of ring element 34 (and accordingly second counter contact surface 48) may also be a boundary surface of a material bond/a weld seam connection between ring element 34 and spindle body 30. Weld seam 40 may possibly be sufficient for holding ring element 34 to spindle body 30, so that the formation of "touching outer surfaces" of ring element 34 and spindle body 30 as contact and counter surfaces 44 and 48 may be omitted. In the specific embodiment of FIGS. 2a and 2b, ring element 34 includes at least one material receptacle depression 50 on its side oriented toward support plate 32. Ring element 34 may thus be pressed pre-tensioned between support plate 32 and spindle body 30, a material projection caused in this way on support plate 32 being introducible into material receptacle depression 50. Furthermore, ring element 34 also includes at least one relief groove 52 on its side oriented toward support plate 32, with the aid of which cracks in ring element 34 are reliably preventable.

Figure 3A:
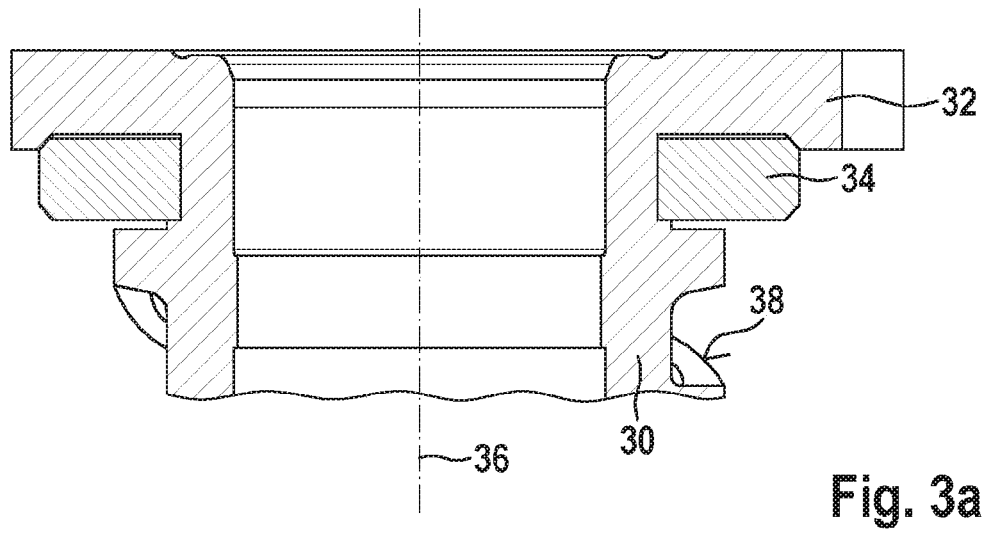
FIGS. 3a and 3b show schematic overall and partial representations of a second specific embodiment of the supported spindle in accordance with the present invention.
Figure 3B:
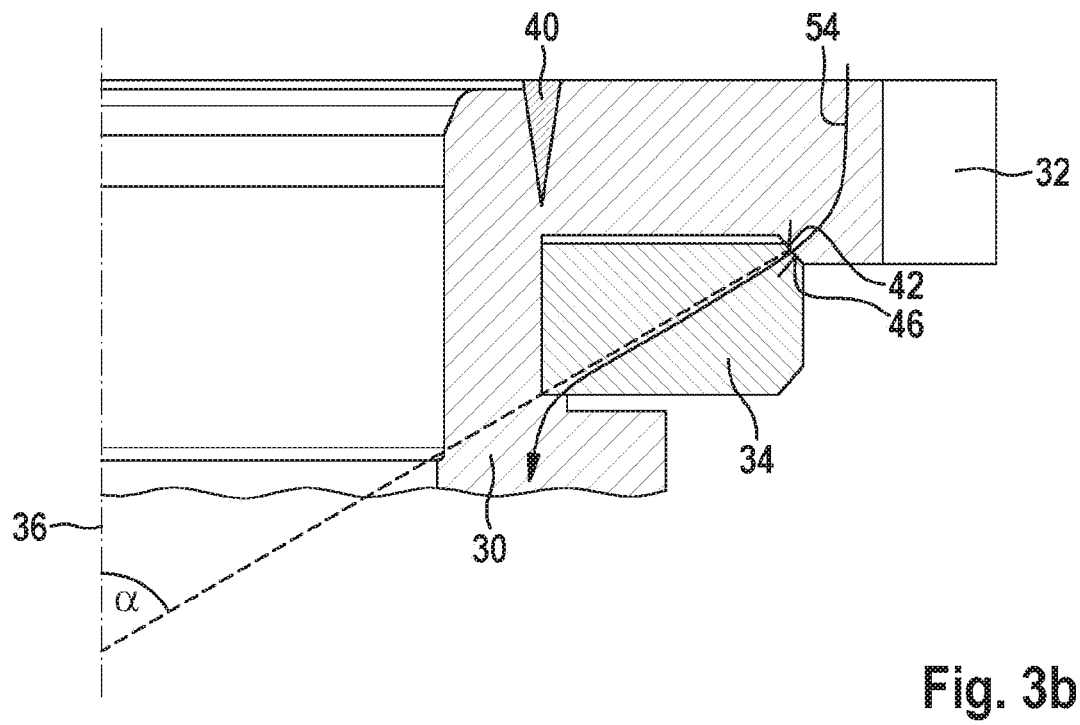

FIGS. 3a and 3b show schematic overall and partial representations of a second specific embodiment of the supported spindle in accordance with the present invention.

The supported spindle schematically shown in FIGS. 3a and 3b made up of (at least) components 30 through 34 differs from the above-described specific embodiment above all in first contact surface 42 of its ring element 34, which contacts first counter contact surface 46 of support plate 32, and which is aligned at a first angle of inclination/a first slope α between 15° and 75° in relation to center longitudinal axis 36 of spindle body 30. A force application from support plate 32 into the ring element may thus take place via a radius-surface contact provided between support plate 32 and ring element 34 at first angle of inclination α. First contact surface 42 of ring element 34 may in particular be aligned at a first angle of inclination α between 25° to 65°, especially at a first angle of inclination α between 35° and 55° or between 50° and 70° (see FIG. 6) in relation to center longitudinal axis 36 of spindle body 30. First contact surface 42 of ring element 34 may alternately also be rounded/outwardly curved. Correspondingly, first counter contact surface 46 of support plate 32 may also be aligned at first angle of inclination α between 15° and 75°, for example, in first angle of inclination α between 25° to 65°, especially at first angle of inclination α between 35° and 55° or between 50° and 70°, or may be rounded/inwardly curved in relation to center longitudinal axis 36 of spindle body 30.

In the example of FIGS. 3a and 3b, first contact surface 42 of ring element 34 and first counter contact surface 46 of support plate 32 are inclined, for example, at a first angle of inclination/a first slope α of 45° in relation to center longitudinal axis 36 of the spindle body. As is apparent in FIG. 3b, support plate 32 may support itself particularly effectively on ring element 34 with such a ring design of ring element 34, a bending load being converted into a pressure load and being introduced into spindle body 30 along a load path 54 (for an axial load) shown in FIG. 3b. This causes an increase of a strength of the supported spindle, which enables, for example, a minimization of the attachment width Δ, or a minimization of the penetration depth of weld seam 40.

To additionally increase a robustness of the supported spindle or to make it insensitive with respect to geometry deviations, ring element 34 may be axially pre-tensioned. This may be effectuated, for example, with the aid of a press connection or a press fit between support plate 32 and spindle body 30.

Reference is made to the above-described specific embodiment with respect to further properties of the supported spindle of FIGS. 3a and 3b.

Figure 4:
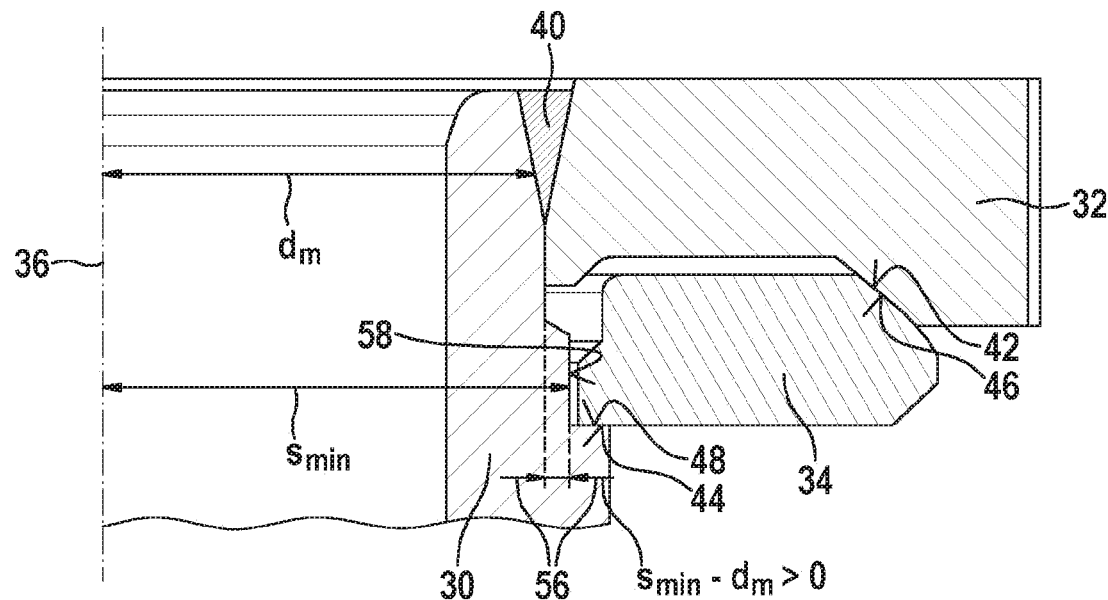
FIG. 4 shows a schematic partial representation of a third specific embodiment of the supported spindle in accordance with the present invention.

FIG. 4 shows a schematic partial representation of a third specific embodiment of the supported spindle in accordance with the present invention.

The supported spindle of FIG. 4 also includes (at least) components 30 through 34, support plate 32 being welded onto spindle body 30 with formation of weld seam 40. As is apparent in FIG. 4, weld seam 40 extends around center longitudinal axis 36 of spindle body 30 at a mean distance $d_m$ to center longitudinal axis 36 of spindle body 30. Mean distance $d_m$ of weld seam 40 to center longitudinal axis 36 of spindle body 30 may also be referred to as a mean radius of weld seam 40.

As an advantageous refinement, spindle body 30 has a protrusion/projection 56 on its section framed by ring element 34. Protrusion 56 may be understood, for example, as a protruding step or a protruding bulge on an outer side extending annularly around center longitudinal axis 36 of spindle body 30 of the section of spindle body 30 framed by ring element 34. Protrusion 56 is formed in such a way that at least one outer surface 58 of protrusion 56 extending around center longitudinal axis 36 of spindle body 30 has a minimum distance $s_{min}$ to center longitudinal axis 36 of spindle body 30, which is greater than mean distance $d_m$ of weld seam 40 to center longitudinal axis 36 of spindle body 30.

With the aid of protrusion 56, in this case welding-on of ring element 34 may be reliably prevented. Even if an introduction depth of the laser beam used for welding support plate 32 onto spindle body 30 varies greatly and thus the penetration depth of weld seam 40 may be greater than thickness $d_{32}$ of support plate 32 in parallel to center longitudinal axis 36 of spindle body 30, welding-on of ring element 34 is still structurally prevented. This may also be described as a sufficient offset being able to be ensured between ring element 34 and spindle body 30 with the aid of protrusion 56.

Reference is made to the above-described specific embodiments with respect to further features of the supported spindle of FIG. 4.

Figure 5:
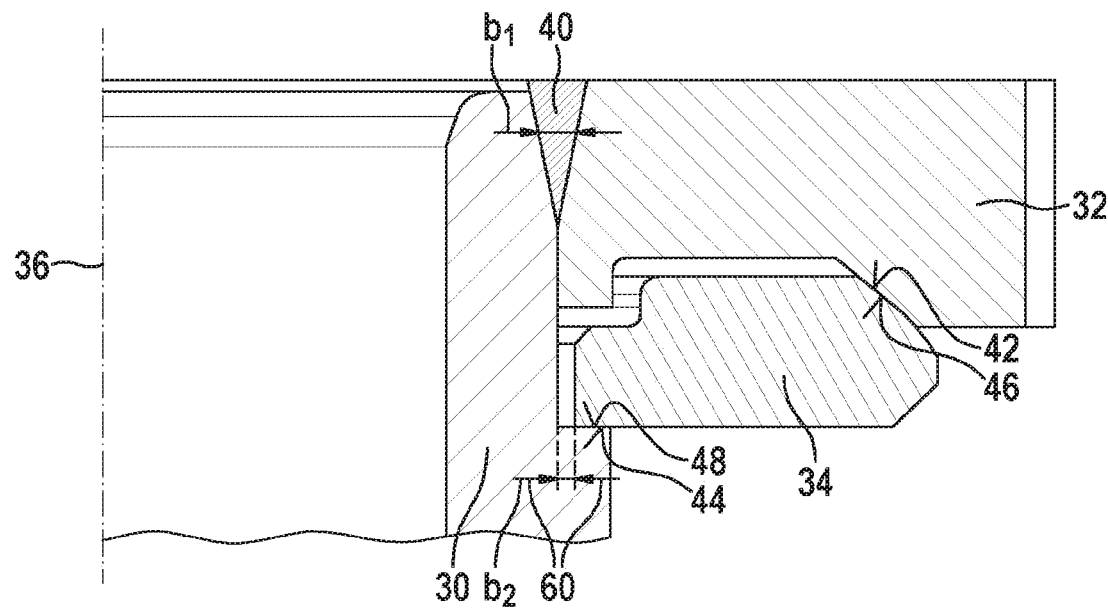
FIG. 5 shows a schematic partial representation of a fourth specific embodiment of the supported spindle in accordance with the present invention.

FIG. 5 shows a schematic partial representation of a fourth specific embodiment of the supported spindle in accordance with the present invention.

The supported spindle schematically shown in FIG. 5 also includes (at least) components 30 through 34, weld seam 40 being formed between support plate 42 and spindle body 30. Weld seam 40 has a mean width $b_1$ radially in relation to center longitudinal axis 36 of spindle body 30.

In the supported spindle of FIG. 5, ring element 34 is clamped between support plate 32 and spindle body 30 in such a way that an air gap 60 is provided between the section of spindle body 30 framed by ring element 34 and ring element 34. Air gap 60 has a mean gap width $b_2$ radially in relation to center longitudinal axis 36 of spindle body 30 greater than or equal to one-fourth of mean width $b_1$ of weld seam 40. Mean gap width $b_2$ of air gap 60 may, for example, be at least equal to one-third of mean width $b_1$ of weld seam 40, preferably at least equal to one-half of mean width $b_1$ of weld seam 40, especially at least equal to three-fourths of mean width $b_1$ of weld seam 40. Air gap 60 formed in this way is sufficiently dimensioned to prevent welding of ring element 34 to spindle body 30.

Reference is made to the above-described specific embodiments with respect to further properties of the supported spindle of FIG. 5.

Figure 6:
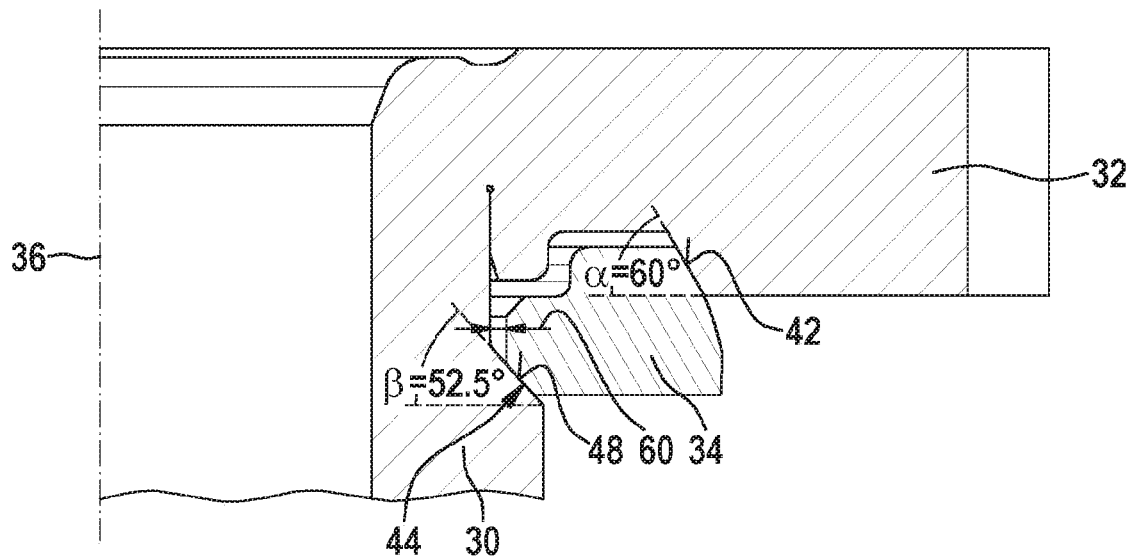
FIG. 6 shows a schematic partial representation of a fifth specific embodiment of the supported spindle in accordance with the present invention.

FIG. 6 shows a schematic partial representation of a fifth specific embodiment of the supported spindle in accordance with the present invention.

In the supported spindle schematically shown in FIG. 6, second contact surface 44 of ring element 34, which contacts second counter contact surface 48 of spindle body 30, is also aligned at a second angle of inclination/a second slope β between 15° and 75° in relation to a reference axis extending perpendicularly to center longitudinal axis 36 of spindle body 30. A force application may thus take place from ring element 34 into spindle body 30 via a radius-surface contact provided between ring element 34 and spindle body 30 at second angle of inclination β. Second contact surface 44 of ring element 34 may in particular be aligned at a second angle of inclination β between 30° to 70°, especially at a second angle of inclination β between 40° and 60° in relation to the reference axis. Second contact surface 44 of ring element 34 may optionally also be rounded/outwardly curved. Correspondingly, second counter contact surface 48 of spindle body 30 may also be aligned at second angle of inclination β between 15° and 75°, for example, at second angle of inclination β between 30° to 70°, especially at second angle of inclination β between 40° and 60°, or may be rounded/inwardly curved in relation to the reference axis. In the example of FIG. 6, second contact surface 44 of ring element 34 and second counter contact surface 48 of spindle body 30 are inclined at a second angle of inclination β of 52.5° in relation to the reference axis.

In addition to the radius-surface contact provided between ring element 34 and spindle body 30 at second angle of inclination β, a further radius-surface contact may also be provided between support plate 32 and ring element 34 at a first angle of inclination α between 15° and 75° in relation to the reference axis. The radius-surface contacts effectuate a compensation of tolerances.

In the specific embodiment of FIG. 6, first contact surface 42 and first counter contact surface 46 are formed to be comparatively steep, having a first angle of inclination α of 60° in relation to the reference axis. The design of ring element 34 of FIG. 6 may therefore be described as a cone ring design. The angle combination described here of first angle of inclination α equal to 60° in relation to the reference axis and second angle of inclination β equal to 52.5° in relation to the reference axis is particularly advantageous, since these angles of inclination α and β prevent relative movements of components 30 through 34 and thus suppress noise generation due to "rubbing."

As an alternative to air gap 60 shown in FIG. 6, the above-described protrusion may also be formed on spindle body 30 of the supported spindle explained here. It is to be noted once again that both air gap 60 and also the protrusion may reliably prevent undesired welding-on of ring element 34 during the welding of support plate 32 to spindle body 30.

All above-described supported spindles may be used in a device which may be, for example, a wheel brake device able to be situated or situated on a wheel of a vehicle or an electromechanical brake booster connectible or connected upstream of a brake master cylinder of a hydraulic braking system. The examples mentioned here for the device are not to be interpreted as exhaustive, however.

Figure 7:
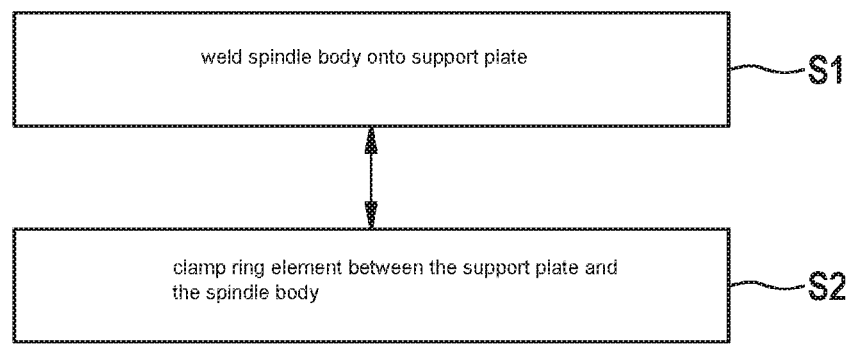
FIG. 7 shows a flowchart to explain a first specific embodiment of the manufacturing method for a supported spindle for a device equipped with a spindle nut, in accordance with the present invention.

FIG. 7 shows a flowchart to explain one specific embodiment of the manufacturing method for a supported spindle for a device equipped with a spindle nut, in accordance with the present invention.

For example, the above-explained supported spindles may be manufactured with the aid of the manufacturing method described hereinafter. However, an ability to carry out the manufacturing method is not restricted to the manufacturing of these supported spindles.

In a method step S1 of the manufacturing method, a spindle body extending along its center longitudinal axis of the later supported spindle is welded onto a support plate in such a way that a weld seam extending around the center longitudinal axis of the spindle body is formed between the spindle body and the support plate. Method step S1 is preferably carried out with the aid of laser welding.

Together with method step S1, a method step S2 is also carried out, in which a ring element framing a section of the center longitudinal axis of the spindle body, which contacts the support plate on at least one first contact surface of the ring element and contacts the spindle body on at least one second contact surface of the ring element, is clamped between the support plate and the spindle body. Tensioning/constraining of the ring element is preferably effectuated with the aid of the laser welding, whereby a robustness of the manufactured supported spindle is additionally increased.

To additionally increase a robustness of the manufactured supported spindle, the ring element may be axially pre-tensioned. The axial pre-tension may be effectuated, for example, with the aid of a press connection/a press fit between the support plate and the spindle body.

Figure 8:
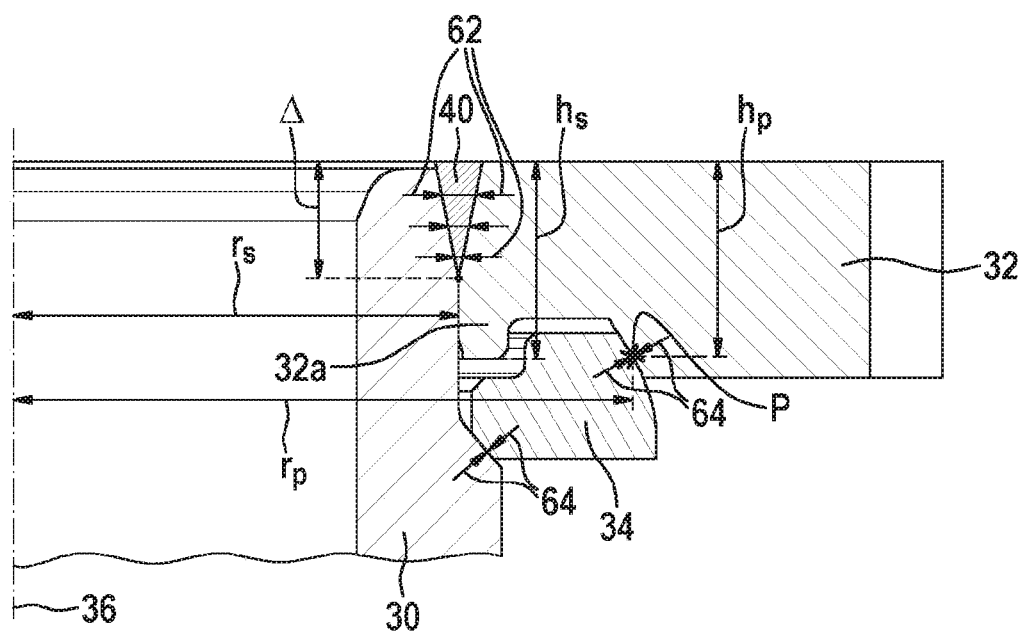
FIG. 8 shows a schematic partial representation of a supported spindle manufactured with the aid of a second specific embodiment of the manufacturing method, in accordance with the present invention.

FIG. 8 shows a schematic partial representation of a supported spindle manufactured with the aid of a second specific embodiment of the manufacturing method, in accordance with the present invention.

The above-described method steps are also carried out in the specific embodiment of the manufacturing method shown with the aid of FIG. 8, after the laser welding, a melt used for the laser welding and subsequently solidified being permitted to "shrink." The "shrinking" of the solidified melt contributes to the further increase of a robustness of the manufactured supported spindle. In particular, the "shrinking" of the solidified melt induces a surface pressure on contact surfaces 42 and 44 (or counter contact surfaces 46 and 48), so that components 30 through 34 press "fully" against one another.

The "shrinking" of the solidified melt is permitted in that first/second contact surfaces 42 and 44 of ring element 34 are aligned at a first/second angle of inclination α and β of 15° to 75° in relation to center longitudinal axis 36 of spindle body 30. A desired contact point P between first contact surface 42 of ring element 34 and support plate 32 is selected, a contact point height $h_P$ as the distance of contact point P to a side of support plate 32 oriented away from ring element 34 and a distance referred to as contact point radius $r_P$ from center longitudinal axis 36 of spindle body 30 being definable for contact point P. A contact area 32a of support plate 32 later contacting spindle body 30 is formed as a joint, a joint height $h_S$ to the side of support plate 32 oriented away from ring element 34 and a distance referred to as joint radius $r_S$ from center longitudinal axis 36 of spindle body 30 being definable for the joint. The "shrinking" of the solidifying melt may reliably be used to increase robustness if contact point height $h_P$ is in a range between 50% to 150% of joint height $h_S$ and contact point radius $r_P$ is in a range between 100% to 200% of joint radius $r_S$. Arrows 62 indicate a shrinking direction of the material after the laser welding, while the surface pressure induced in this way is indicated with the aid of arrows 64. Moreover, it is advantageous if attachment width Δ is at least 30% of joint height $h_S$.

What is claimed is:

1. A supported spindle for a device equipped with a spindle nut, the supported spindle comprising:
   a spindle body extending along a center longitudinal axis of the spindle body;
   a support plate welded onto the spindle body in such a way that a weld seam formed between the spindle body and the support plate extends around the center longitudinal axis of the spindle body; and
   a ring element which frames a section of the center longitudinal axis of the spindle body, the ring element contacts the support plate on at least one first contact surface of the ring element and contacts the spindle body on at least one second contact surface of the ring element in such a way that the ring element is clamped between the support plate and the spindle body.

2. The supported spindle as recited in claim 1, wherein the ring element has at least one material receptacle depression on a side oriented toward the support plate and is pressed pre-tensioned between the support plate and the spindle body.

3. The supported spindle as recited in claim 1, wherein the ring element includes at least one relief groove on a side oriented toward the support plate.

4. The supported spindle as recited in claim 1, wherein the first contact surface of the ring element, which contacts the support plate, is rounded or aligned at a first angle of inclination between 15° and 75° in relation to the center longitudinal axis of the spindle body.

5. The supported spindle as recited in claim 1, wherein the second contact surface of the ring element, which contacts the spindle body, is rounded or aligned at a second angle of inclination between 15° and 75° in relation to the center longitudinal axis of the spindle body.

6. The supported spindle as recited in claim 1, wherein the weld seam extends at a mean distance to the center longitudinal axis of the spindle body around the center longitudinal axis of the spindle body, and the spindle body has a protrusion on a section framed by the ring element, which is configured in such a way that at least one outer surface of the protrusion extending around the center longitudinal axis of the spindle body has a minimum distance to the center longitudinal axis of the spindle body, which is greater than the mean distance of the weld seam to the center longitudinal axis of the spindle body.

7. The supported spindle as recited in claim 1, wherein the weld seam has a mean width radially in relation to the center longitudinal axis of the spindle body, and the ring element is clamped between the support plate and the spindle body in such a way that an air gap is provided between the section of the spindle body framed by the ring element and the ring element which has a mean gap width radially in relation to the center longitudinal axis of the spindle body greater than or equal to one-fourth of the mean width of the weld seam.

8. The supported spindle as recited in claim 1, wherein:
   the spindle body includes a spindle body thread configured to engage a spindle nut thread of a spindle nut; and
   the support plate is configured to hold the spindle body in a rotationally-fixed manner in such a way that the supported spindle is adjustable when the spindle nut is set into rotation along an adjustment axis on which the center longitudinal axis of the spindle body lies.

9. A device, comprising:
   a supported spindle including:
      a spindle body extending along a center longitudinal axis of the spindle body,
      a support plate welded onto the spindle body in such a way that a weld seam formed between the spindle body and the support plate extends around the center longitudinal axis of the spindle body, and
      a ring element which frames a section of the center longitudinal axis of the spindle body, the ring element contacts the support plate on at least one first contact surface of the ring element and contacts the spindle body on at least one second contact surface of the ring element in such a way that the ring element is clamped between the support plate and the spindle body; and
   a spindle nut including a spindle nut thread, in which a spindle body thread of the spindle body engages;
   wherein the spindle body is held in a rotationally-fixed manner using the support plate in such a way that the supported spindle is adjustable using the spindle nut set into rotation along an adjustment axis, on which the center longitudinal axis of the spindle body lies.

10. The device as recited in claim 9, wherein the device is a wheel brake device able to be situated or situated at a wheel of a vehicle or an electromechanical brake booster connectible or connected upstream of a brake master cylinder of a hydraulic braking system.

11. The supported spindle as recited in claim 9, wherein the supported spindle is configured to be integrated in a wheel brake device situated or situated at a wheel of a vehicle.

12. The supported spindle as recited in claim 9, wherein the supported spindle is configured to be integrated in an electromechanical brake booster connectible to, or connected upstream of, a brake master cylinder of a hydraulic braking system.

13. A manufacturing method for a supported spindle for a device equipped with a spindle nut, the method comprising the following steps:
 welding a spindle body, which extends along a center longitudinal axis of the spindle body, on a support plate in such a way that a weld seam extending around the center longitudinal axis of the spindle body is formed between the spindle body and the support plate; and
 clamping, a ring element framing a section of the center longitudinal axis of the spindle body, which contacts the support plate on at least one first contact surface of the ring element and contacts the spindle body on at least one second contact surface of the ring element, between the support plate and the spindle body.

\* \* \* \* \*